United States Patent [19]
Onoda et al.

[11] Patent Number: 5,228,258
[45] Date of Patent: Jul. 20, 1993

[54] COLLAPSIBLE TRUSS STRUCTURE

[75] Inventors: Junjiro Onoda, 1986-10, Kanai-Machi, Machida-Shi, Tokyo-To; Kiyoshi Takamatsu, Tokyo, both of Japan

[73] Assignees: Fuji Jukogyo Kabushiki Kaisha, Tokyo; Onoda Junjiro, Machida, both of Japan

[21] Appl. No.: 789,790

[22] Filed: Nov. 12, 1991

Related U.S. Application Data

[63] Continuation of Ser. No. 441,262, Nov. 27, 1989, abandoned.

[51] Int. Cl.$^5$ ............................................. E04H 12/18
[52] U.S. Cl. ......................................... 52/646; 343/915
[58] Field of Search .................. 343/915; 52/645, 646, 52/111, 108, 632, 648, 655

[56] References Cited

U.S. PATENT DOCUMENTS

| | | | |
|---|---|---|---|
| 3,913,105 | 10/1975 | Williamson et al. | 343/915 |
| 4,475,323 | 10/1984 | Schwartzberg et al. | 52/645 X |
| 4,482,900 | 11/1984 | Bilek et al. | 343/915 |
| 4,578,920 | 4/1986 | Bush et al. | |
| 4,615,637 | 10/1986 | Pelischek | 403/85 |
| 4,667,451 | 5/1987 | Onoda | 52/646 |
| 4,745,725 | 5/1988 | Onoda | 52/646 |
| 4,771,585 | 9/1988 | Onoda et al. | 52/646 |
| 4,819,399 | 4/1989 | Onoda | 52/645 X |

Primary Examiner—Carl D. Friedman
Assistant Examiner—Christopher T. Kent
Attorney, Agent, or Firm—Beveridge, DeGrandi, Weilacher & Young

[57] ABSTRACT

A collapsible truss structure having a shape of a rectangular parallelepiped when expanded is an open truss framework made up of skeletal members pin jointed together by joint connectors to form sixteen rectangular bays, four of which have diagonal braces, and supports panels for covering one face of the structure. The joint connectors permit the structure to be folded by power means in two directions into a compact slab for storage and/or transportation with the panels assembled therewith, while elastically biasing means automatically unfold the structure into its expanded state. Planar, single-curvature, and double-curvature panels can be thus supported. This structure can be optionally assembled with other structures to form larger structural assemblies.

12 Claims, 10 Drawing Sheets

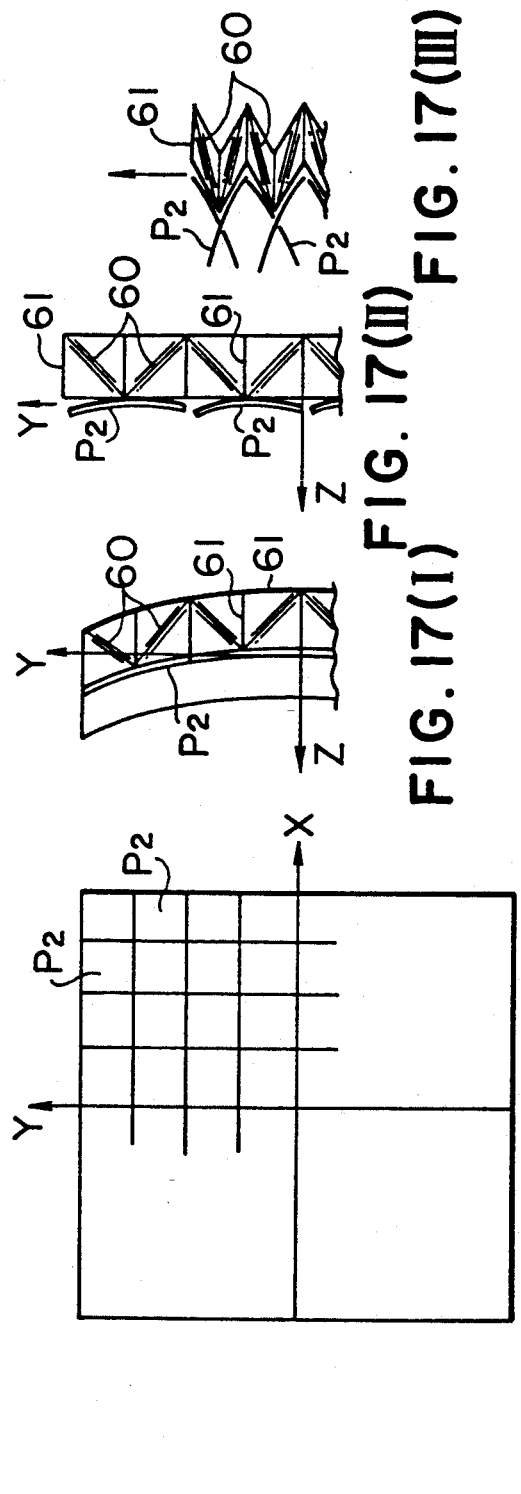

COLLAPSIBLE TRUSS STRUCTURE

This application is a continuation of application Ser. No. 07/441,262, filed Nov. 27, 1989, Nov. 27, 1989, now abandoned.

BACKGROUND OF THE INVENTION

The present invention relates to truss structures that can be collapsed into compact forms for storage and/or transportation and conversely deployed or expanded for use in various applications. The truss structures have numerous uses in outer space as large size structures such as parabolic antennas and solar heat ray collectors placed in orbit and emergency shelters for medical treatment in disaster areas on earth.

In the exploration and study of outer space, it is often necessary to erect structures made up of panels in space. This necessitates auxiliary assistance such as that of a robot arm of a space shuttle or that of one or more astronauts working outside a spacecraft. However, such auxiliary assistance is expensive. Furthermore, the duration of flight of a space shuttle is limited. For this reason, the size and scope of the structures which can be erected in space are limited. Moreover the time required for the erection of such structures tends to become long.

Accordingly, deployable or expansible structural assemblies capable of expanding or unfolding automatically without outside assistance become necessary. Expansible structures of such character have been proposed as disclosed in, for example, U.S. patent application Ser. No. 025,362 or U.S. Pat. No. 4,578,920.

The teachings of these known proposals, however, are insufficient for expansible supporting construction having curved surfaces such as parabolic surfaces. For example, according to the prior art, only planar panels or panel surfaces are expansible, and no consideration has been given to supporting construction such as trusswork for supporting panel surfaces, and therefore there is no practical merit.

SUMMARY OF THE INVENTION

Accordingly, it is an object of the present invention to provide expansible structures of a construction which makes possible the expansion of not only planar panels but also curved surfaces having curvatures in one direction or in two directions (double-curvature surfaces), and which include also trusswork for supporting these surfaces.

According to the present invention, there is provided an expansible truss structure in the form of an open framework in the shape of a rectangular box parallelepiped when expanded. The structure is characterized in that, by coupling together first ends of three first vertical truss members disposed in parallel and spaced apart in a first common plane by way of first joint connectors with first horizontal truss members and coupling together the opposite second ends of said first vertical truss members by way of second joint connectors with second horizontal truss members, a first truss is provided in the form of two rectangles disposed adjacently in the first common plane. The structure is further characterized in that, by similarly coupling together first ends of three second vertical truss members disposed in parallel and spaced apart in a second common plane by way of third joint connectors with third horizontal truss members and coupling together the opposite second ends of said second vertical truss members by way of fourth joint connectors with fourth horizontal truss members, a second truss is provided in the form of two rectangles disposed adjacently in said second common plane. The first and second trusses are in mutually opposed and spaced-apart disposition when the structure is in expanded state and are foldable in the same direction in the form of two dihedral V-shapes as viewed in the direction of the trusses with the middle vertical truss members of the three first vertical truss members and of the three second vertical truss members, respectively, constituting the intersection line of the dihedral V-shaped fold. The joint connectors of the first truss and corresponding joint connectors of the second truss are coupled by coupling members on the first truss side and coupling members on the second truss side, which are respectively coupled by intermediate joint connectors. All intermediate joint connectors so pivotally support two pairs of first and second connective members related thereto that the connective members can undergo rotational displacement within planes containing corresponding vertical truss members of the first and second trusses. The intermediate joint connectors related to the first ends of the vertical truss members are mutually interconnected by the first connective members, while the intermediate joint connectors related to the second ends of the vertical truss members are also mutually interconnected by the second connective members. The intermediate joint connectors on the first end side of the vertical truss members and corresponding intermediate joint connectors on the second end side are coupled together by post rods. A panel is mounted at each of the bays on the second end side each bounded by a horizontal truss member, a coupling member, and a connective member. The expansible truss structure constitutes a single structural unit capable of being used in combination with other like units.

When the expansible structure of the present invention is in its expanded state, a surface of its framework of skeletal members is covered by panels. This expanded structure is folded in the following manner. The above described first and second trusses in mutually opposed state are folded in the same direction along their middle vertical truss members as fold lines. The two trusses thereby approach each other as double dihedral frames. In accordance with this angular deformation, the six pairs of coupling members, still in the state of being mutually connected by the four connective members, are bent into an inverted V-shape each. In this manner the coupling members are folded in the same direction as the trusses. Finally, the structure is folded into a compact slab form with the panels still assembled therewith. Expansion of the folded structure takes place in a reverse sequence to that described above.

Preferred embodiments of the present invention will become understood from the following detailed description referring to the accompanying drawings.

BRIEF DESCRIPTION OF THE DRAWINGS

FIGS. 17(0), 17(I), 17(II), 17(III), 17(I)', 17(II)', and 17(III)' are views in various orthogonal axial directions for an explanation of another embodiment of the expansible structure according to the present invention provided with panels having curvature in two directions or double curvature.

DETAILED DESCRIPTION OF PREFERRED EMBODIMENTS

Figure 1:
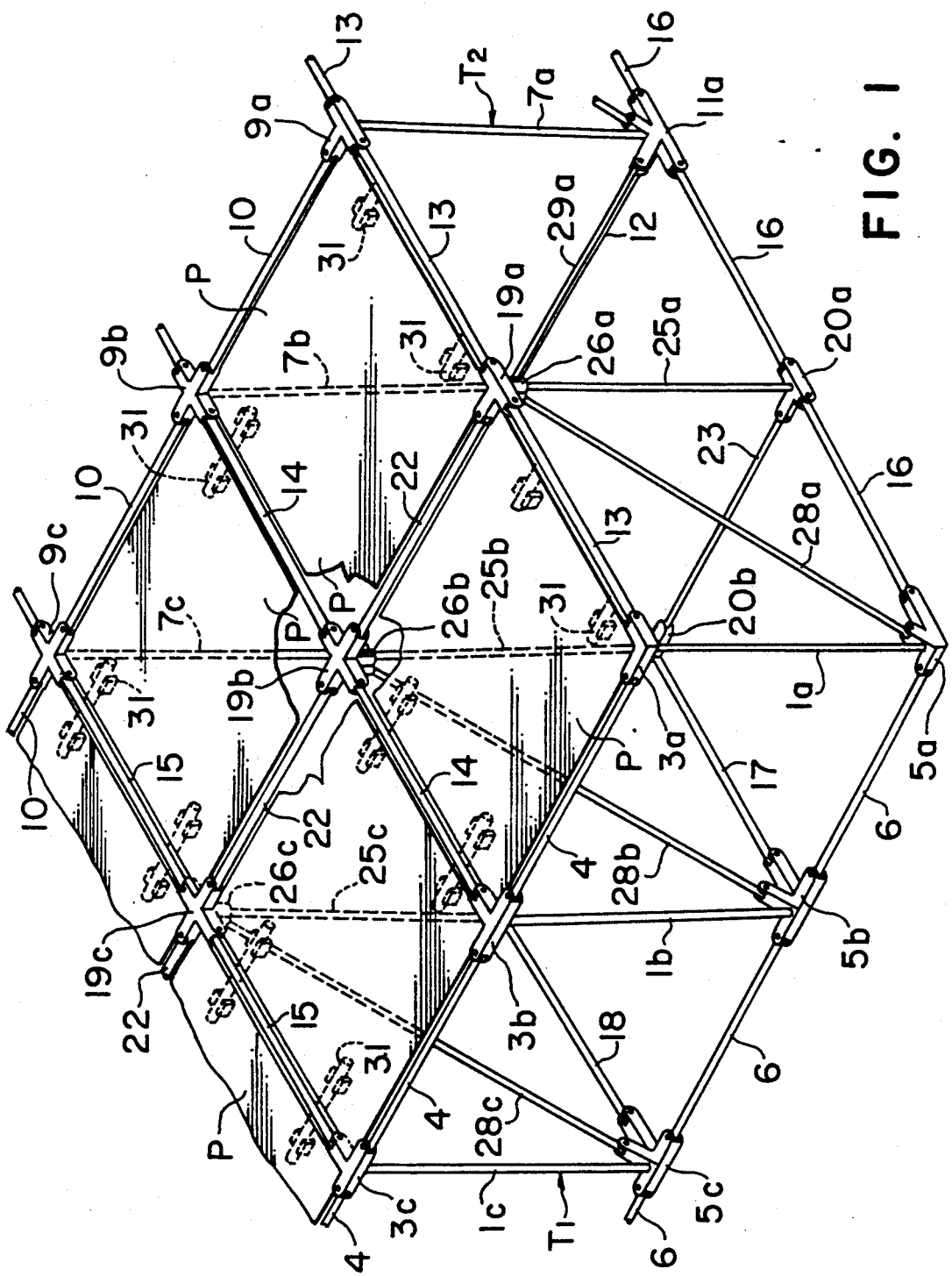
FIG. 1 is a perspective view of an expansible structure according to the present invention in its deployed or expanded state.

In one embodiment of the present invention as illustrated in FIGS. 1 through 4, there are provided oppositely arranged first and second trusses $T_1$ and $T_2$. The first truss $T_1$ is of the following construction. The truss $T_1$ has three first vertical skeletal truss members $1a$, $1b$, and $1c$ which are in parallel, spaced relation. The adjective "vertical" is herein used for convenience in description and designates the vertical orientation as viewed in FIG. 1.

The upper ends (as viewed in FIG. 1) of the vertical truss members $1a$, $1b$, and $1c$ are pin jointed to joint connectors $3a$, $3b$, and $3c$ which are mutually connected to each other by first horizontal skeletal truss members 4. The lower ends of the vertical truss members $1a$, $1b$, and $1c$ are pin jointed to second joint connectors $5a$, $5b$, and $5c$ which are mutually connected by second horizontal truss members 6. Thus the first truss $T_1$ consists of two rectangular parts disposed adjacently side-by-side and is made up of the vertical truss members $1a$, $1b$, and $1c$, horizontal truss members 4 and 6, and joint connectors $3a$, $3b$, $3c$, $5a$, $5b$, and $5c$. The first truss $T_1$ constitutes a single truss unit. Generally, a large number of such truss units are serially connected in the horizontal direction of the horizontal truss members 4 and 6.

The joint connectors $3a$, $3b$, and $3c$ and $5a$, $5b$, and $5c$ are members for rotatable pin jointing various skeletal members together. In the illustrated embodiment, each joint connector has projecting parts of a number corresponding to the number of skeletal members to be connected. The outer end of each projecting part has the form of a clevis to which the end of a skeletal member is pivotally connected. It is to be understood that the shape of the joint connectors is not limited to that shown in the drawings.

A second truss $T_2$ is disposed apart from and in confronting opposition to the first truss $T_1$. In the illustrated embodiment, the second truss $T_2$ is of the same shape and same size as the first truss $T_1$ and is parallel thereto. The second truss $T_2$ has the same components as the first truss $T_1$. More specifically, three second vertical skeletal truss members $7a$, $7b$, and $7c$ are coupled at their upper ends (as viewed in FIG. 1) by way of third joint connectors $9a$, $9b$, and $9c$ by third horizontal skeletal truss members 10. The other or lower ends of the vertical truss members are coupled by way of fourth joint connectors $11a$, $11b$, and $11c$ by fourth horizontal truss members 12. The joint connectors $11b$ and $11c$ and one horizontal truss member 12 are not visible in FIG. 1. The second truss $T_2$ is also a truss unit. Generally, a large number of such truss units are connected in the horizontal direction in series.

The corresponding joint connectors of the first and second trusses $T_1$ and $T_2$, that is, joint connectors $3a$ and $9a$, $3b$ and $9b$, $3c$ and $9c$, $5a$ and $11a$, $5b$ and $11b$, and $5c$ and $11c$, are coupled respectively by pairs of first coupling skeletal members 13, 13; 14, 14; and 15, 15; and of second coupling members 16, 16; 17, 17; and 18, 18. Each pair of these coupling skeletal members 13, 14, 15, 16, 17 and 18 are joined in end-to-end alignment by way of an intermediate joint connector, one member being on the side of the first truss $T_1$ and the other member being on the side of the second truss $T_2$. The pairs of coupling skeletal members 13, 14, 15, 16, 17 and 18 are thus joined by way of first intermediate joint connectors $19a$, $19b$, and $19c$ and second intermediate joint connectors $20a$, $20b$, and $20c$ ($20c$ not visible in FIG. 1), respectively.

Figure 2A:
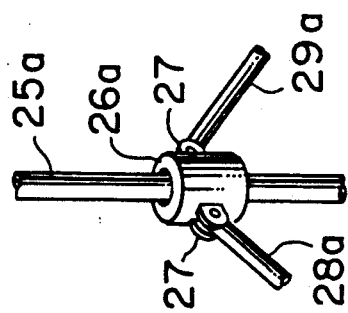
FIG. 2a is a fragmentary perspective view in simplified form showing a representative slide connector and related parts.
Figure 2:
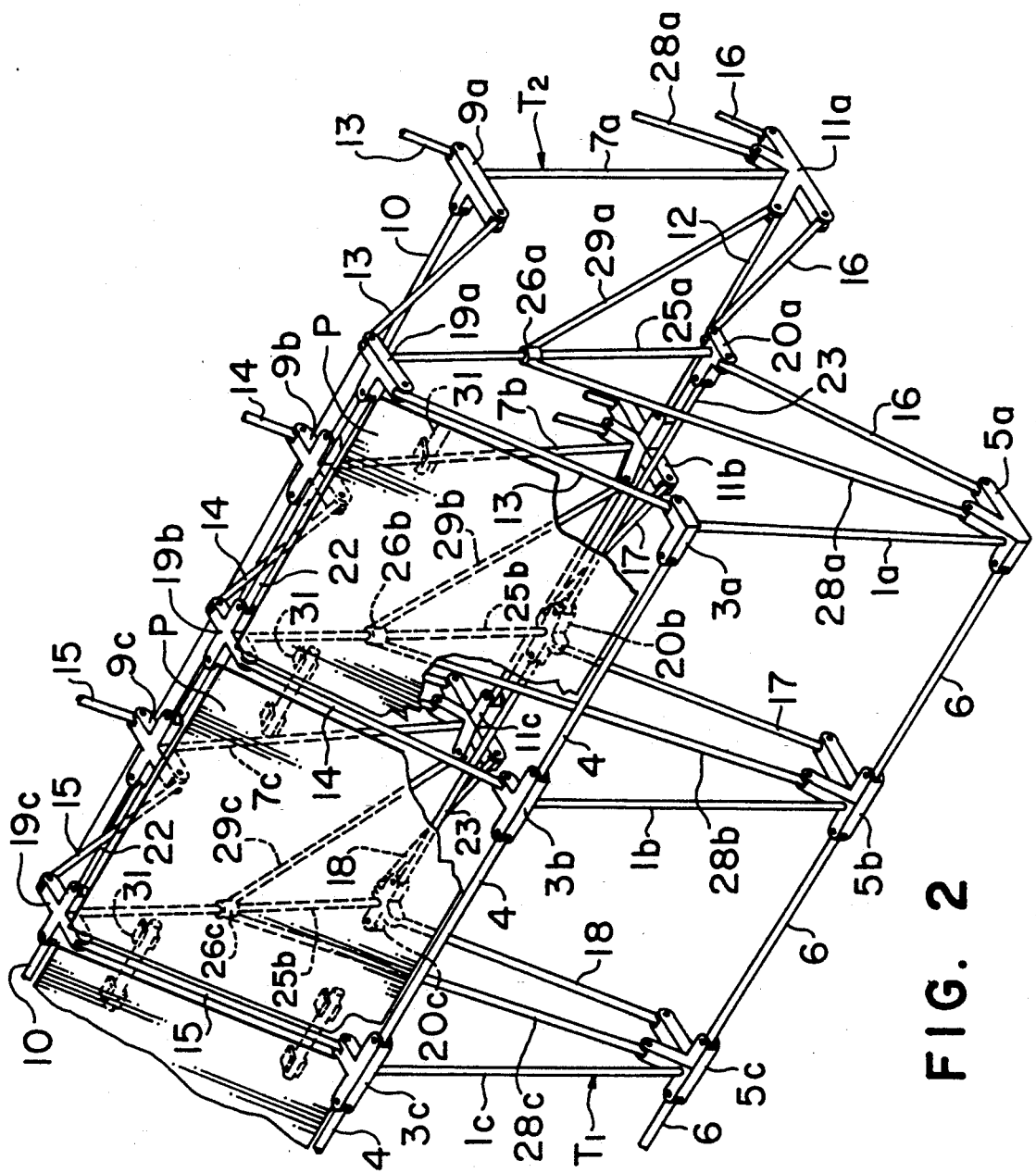
FIG. 2 is a perspective view of the same structure in the initial stage of its folding process.

As described more fully hereinafter, the intermediate joint connectors $19a$, $19b$, $19c$, $20a$, $20b$, and $20c$ will be moved upwards as indicated in FIG. 2 relative to the first and second trusses $T_1$ and $T_2$ when the entire deployed structure is folded. For the folding process, the coupling skeletal members 13 through 18 are required to undergo angular displacement relative to their respective intermediate joint connectors $19a$, $19b$, $19c$, $20a$, $20b$, and $20c$. This angular displacement takes place within three vertical parallel planes in which the opposed vertical truss members $1a$ and $7a$, $1b$ and $7b$, and $1c$ and $7c$ of the first and second trusses $T_1$ and $T_2$ lie. Therefore the coupling skeletal members 13 through 18 are so pin jointed and therefore pivotally supported at their ends by the respective intermediate joint connectors that they can undergo the angular displacement described above.

The first intermediate joint connectors $19a$, $19b$, and $19c$ at the upper part of the structure are mutually interconnected by first connective skeletal members 22. Similarly, the second intermediate joint connectors $20a$, $20b$, and $20c$ at the lower part of the structure are mutually interconnected by second connective skeletal members 23.

The first intermediate joint connectors $19a$, $19b$, and $19c$ at the upper part of the structure are joined respectively to the second intermediate joint connectors $20a$, $20b$, and $20c$ at the lower part of the structure by vertical post rods $25a$, $25b$, and $25c$, respectively. The ends of the post rods 25a-c are rigidly fixed to their respective intermediate joint connectors 20a-c.

Slide connectors 26a, 26b, and 26c are slidably fitted around the post rods 25a, 25b, and 25c, respectively. As shown representatively in FIG. 2a, each slide connector has a collar. Each slide connector has, on its outer surface at diametrically opposite sides, clevis brackets 27. The slide connectors 26a, 26b, and 26c are pivotally connected by the brackets 27 to the upper ends of diagonal braces 28a and 29a, 28b and 29b, and 28c and 29c. The lower ends of the diagonal braces are pivotally connected to the aforedescribed joint connectors 5a and 11a, 5b and 11b, and 5c and 11c, respectively.

A panel P is mounted within the bay bounded by the horizontal skeletal truss member 4, the coupling skeletal members 13 and 14, and the connective member 22. The panel P is thus mounted on the coupling skeletal members 13 and 14 by mounting devices 31. Similarly, like panels P are mounted in other like bays. In the illustrated embodiment, the panels P are planar panels. These panels P are used as antennas or as base plates for mounting other members or articles.

The deployable structure described above is of a module or a unit construction. The structure is useful and functional by itself for any purposes. Ordinarily, the structure is used as a combination of a large number of similar units connected in series.

Figure 4:
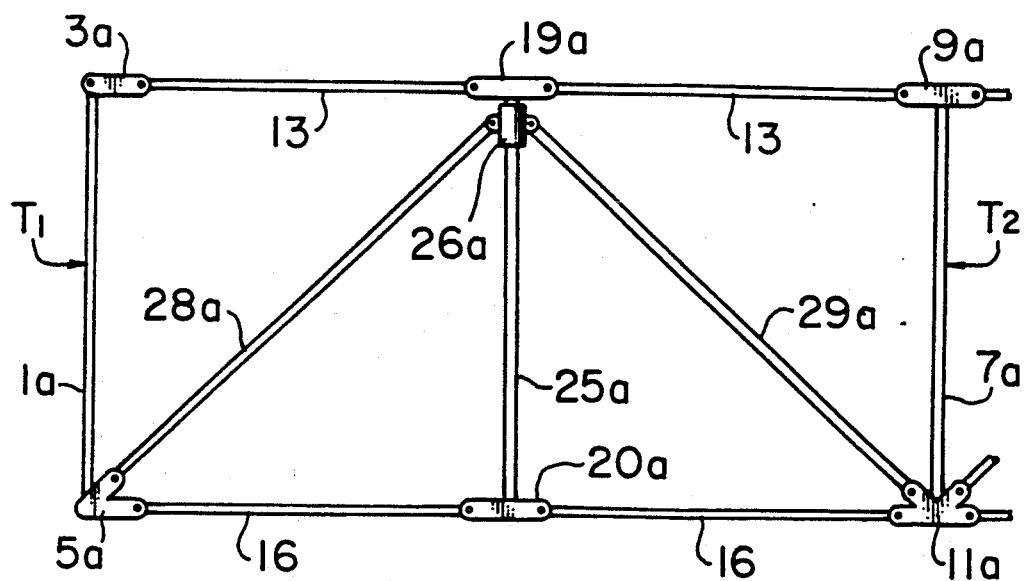
FIG. 4 is a side view of the same expansible structure.

The deployable structure is in the state indicated in FIG. 1 when deployed or expanded. FIG. 4 is a right-hand side view of the structure as viewed in FIG. 1 from the right in a direction parallel to horizontal truss members 4 and 10. As shown in FIG. 4, the slide connector 26a (26b, 26c) is in the highest position close to the intermediate joint connector 19a (19b, 19c).

In order to fold the expansible structure shown in FIG. 1, the first intermediate joint connectors 19a, 19b, and 19c are raised and caused to undergo upward displacement as viewed in the drawings in a central plane parallel to the planes including the first and second trusses $T_1$ and $T_2$, as shown in FIG. 2. As a consequence, the first coupling skeletal members 13, 14 and 15 rotate to assume inverted V-shapes forms within respective planes in which vertical truss members 1a and 7a, 1b and 7b, and 1c and 7c lie. The panels P on the two sides thereby assume the shape of a gable roof.

At the same time, the slide connectors 26a, 26b, and 26c are displaced downwardly as viewed in FIG. 2 relative to their respective post rods 25a, 25b, and 25c. Simultaneously, the second intermediate joint connectors 20a, 20b, and 20c and the second coupling skeletal members 16, 17, 18 on the lower side as viewed in FIGS. 1 and 2 undergo a similar displacement as the first intermediate joint connectors and first coupling skeletal members on the upper side. The displacements described above are achieved in actual practice by applying a driving force to the slide connectors 26a, 26b, and 26c. The manner in which the driving force is applied to the slide connectors will be described in detail hereinafter with respect to an example.

As the displacements proceed as described above, the slopes of the gable-like panels P become more and more steep. At the same time, the first and second trusses $T_1$ and $T_2$ gradually approach each other.

Figure 3:
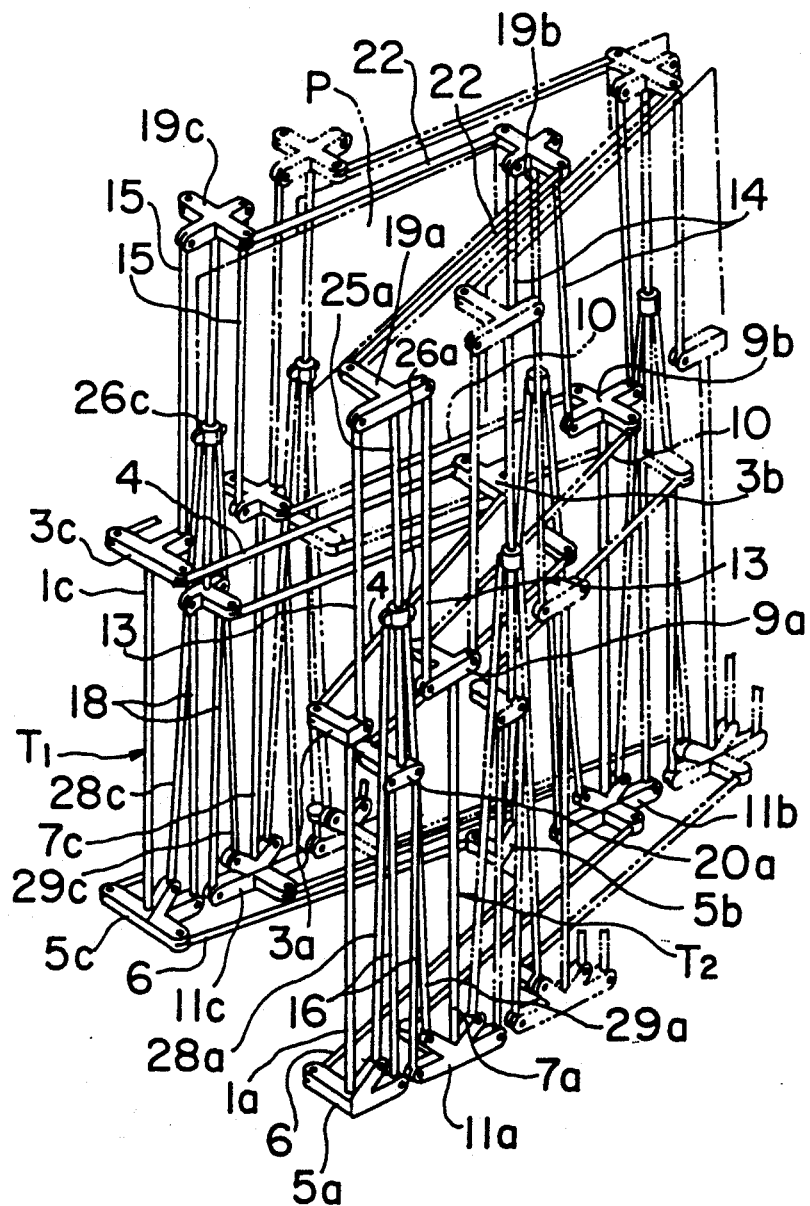
FIG. 3 is also a perspective view showing the same expansible structure in a state immediately prior to completion of its folding process.

As the displacements described above take place, the two trusses $T_1$ and $T_2$ undergo a transformation as follows. As shown in FIG. 3, the intermediate vertical truss members 1b and 7b of the two trusses $T_1$ and $T_2$ are displaced toward the right, as viewed in FIG. 3, relative to the other vertical truss members 1a, 1c, 7a, and 7c on opposite sides thereof. Consequently, the two trusses $T_1$ and $T_2$ are folded to form a V-shape, as viewed in the truss plane direction (i.e., as viewed from above in FIG. 3) so that the intermediate truss members 1b and 7b constitute a folding line of the Vee-shaped dihedral. Together with this movement, the coupling skeletal members 14 are also displaced toward the right as viewed in FIG. 3. As described hereinbefore, the skeletal members 14 are coupled by way of joint connectors 3b and 9b to the ends on one side (upper ends) of the intermediate truss members 1b and 7b.

Understanding of this folding displacement will be facilitated when the mechanism is considered as follows. With the structure in the state shown in FIG. 2, the first and second trusses $T_1$ and $T_2$ are considered as approaching even closer to each other until the entire structure is in a state which is substantially that of a flat plate. The structure in the flat-plate state is considered to be folded into two plies along the intermediate truss members 1b and 7b and the coupling skeletal members 14. Actually, however, the displacements of the first and second trusses $T_1$ and $T_2$ in approaching each other and the folding displacements all progress simultaneously.

Figure 5:
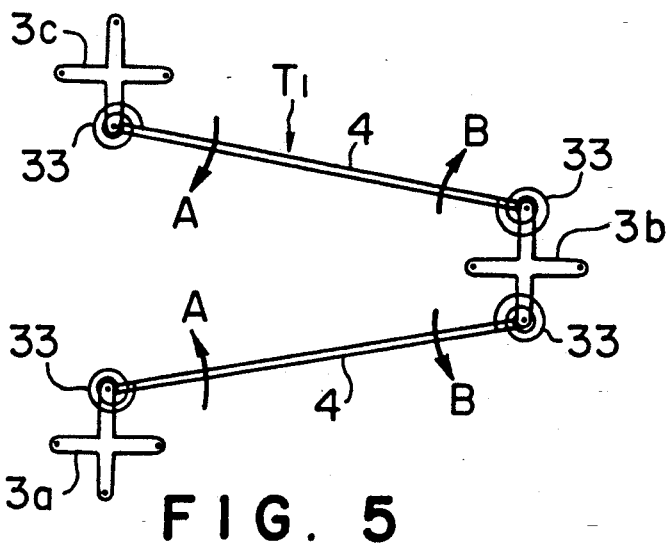
FIG. 5 is a plan view showing one example of means for forcibly expanding the structure.

The structure in the folded state described above is transformed automatically into the deployed or expanded state in the following manner. As shown in FIG. 5, torsion springs 33 are installed so as to impart torques to the truss $T_1$ as indicated by arrows A and B. The torsion springs 33 are mounted around the pivotal shafts of the first and second joint connectors 3a, 3b, 3c, 5a, 5b, and 5c and the first and second horizontal truss members 4 and 6. Forces constantly tending to expand the first truss $T_1$ from its folded state shown in FIG. 5 toward its planar state shown in FIG. 1 are thereby imparted. Torsion springs 33 are provided in the same manner also for the second truss $T_2$. Springs of this kind are provided also for the joint connectors 19a, 19b, 19c, 20a, 20b, 20c, 9a, 9b, 9c, 11a, 11b, and 11c as shown in FIG. 1.

Figure 6:
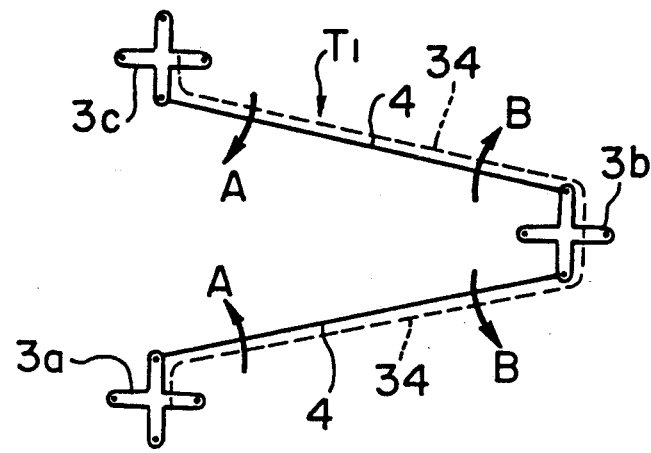
FIG. 6 is a plan view showing another example of means for forcibly expanding the structure.

Equivalent expanding forces may also be imparted by using flexible rods 34 as shown in FIG. 6 in place of the torsion springs 33. The flexible rods 34 have a characteristic of tending to straighten from their bent state shown in FIG. 6.

The folding of the entire expansible structure as described hereinabove progresses further from the state indicated in FIG. 3 until the structure becomes substantially a slab. Thus the structure is in a compactly folded state. In this state, the panels P are also assembled within the structure folded as indicated in FIG. 3.

As mentioned hereinbefore, the folding of the structure from the expanded state to the folded state may be carried out by imparting a driving force to the slide connectors 26a, 26b, and 26c for displacement thereof. The details of one example of accomplishing this will now be described with respect to the case of the slide connector 26a as a representative example and with reference to FIGS. 7 through 11.

Figure 7:
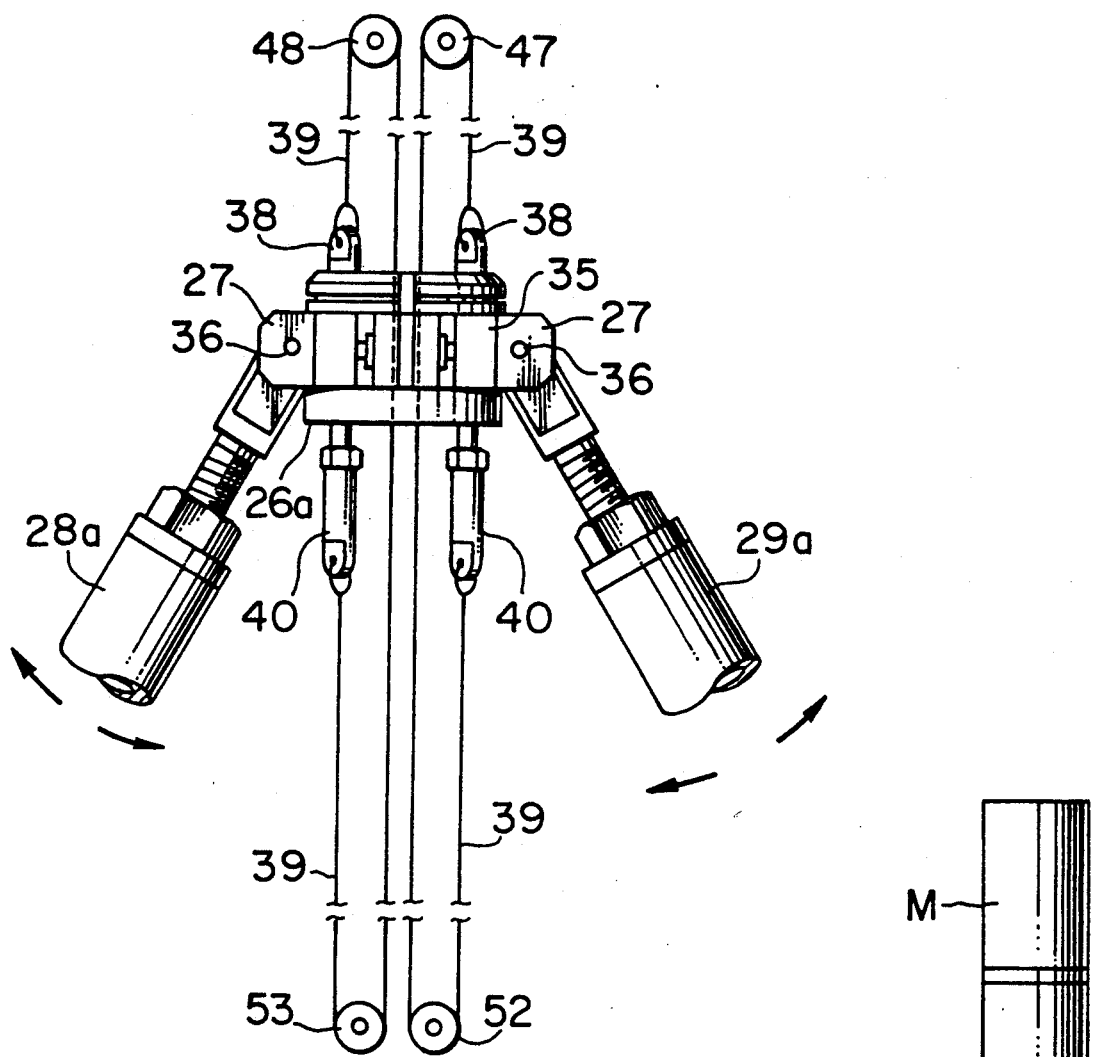
FIG. 7 is a side view, partly in schematic form, showing a mechanism for driving a slide connector.

The slide connector 26a shown in FIG. 7 has a collar 35 as its principal structural part. The collar 35 is slidably fitted around the post rod 25a to be freely slidable therealong. The aforementioned clevis brackets 27 are secured integrally to the outer surface of the collar 35 at diametrically opposite sides thereof. The clevis brackets 27 pivotally support one ends of the diagonal braces 28a and 29a by pins 36. At one end (upper end as viewed in FIG. 7) of the collar 35 a pair of wire cable anchors 38 are secured. The ends of wire cables 39 on one side are fixed to the cable anchors 38. Cable anchors 40 are similarly secured to the other (lower) end of the collar 35. The other ends of the cables 39 are fixed to the cable anchors 40.

Figure 8:
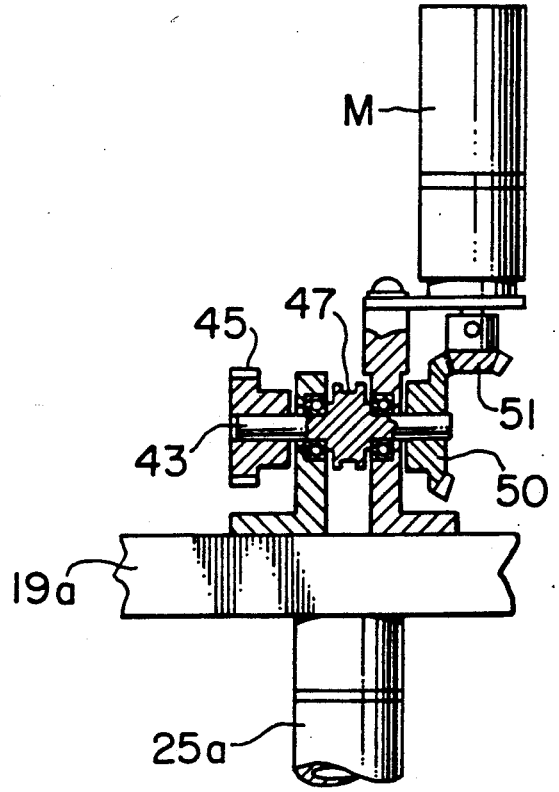
FIG. 8 is an end view, partly in section, of the motive power means of the mechanisms shown in FIG. 7.
Figure 9:
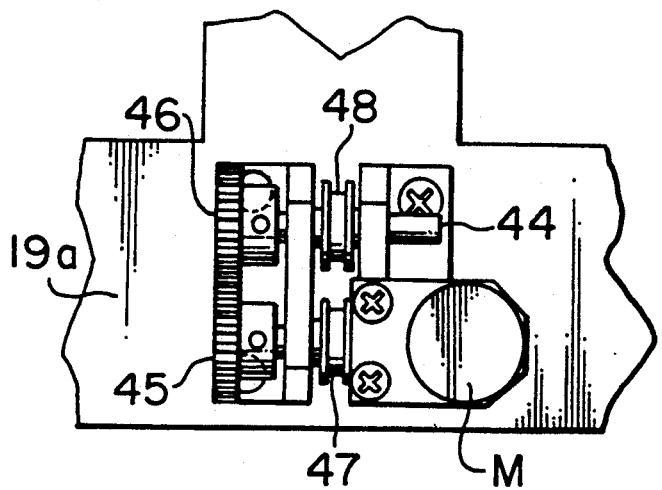
FIG. 9 is a plan view of the actuating means shown in FIG. 8.
Figure 10:
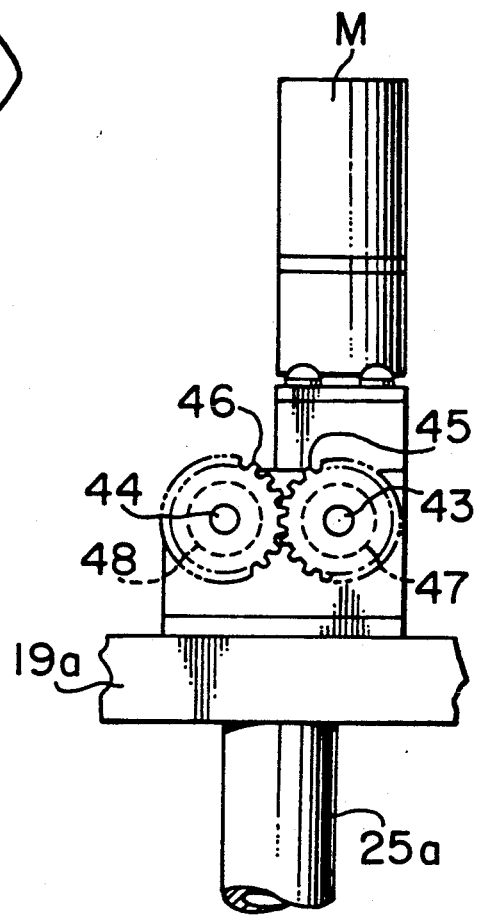
FIG. 10 is a side view of the means shown in FIG. 9.

As shown in FIG. 8, the aforementioned intermediate joint connector 19a is connected to the upper end of the post rod 25a. A pair of parallel shafts 43 and 44 are rotatably and horizontally mounted on the upper surface of the intermediate joint connector 19a as shown in FIGS. 8, 9, and 10. The shafts 43 and 44 fixedly support spur gears 45 and 46 on one side at their ends. The spur gears 45 and 46 are meshed with each other. Furthermore, the shafts 43 and 44 fixedly support pulleys 47 and 48 at their middle parts. A bevel gear 50 is fixed to the other end of the shaft 43 as shown in FIG. 8. The bevel gear 50 is driven by a reversible motor M through a bevel gear 51. Therefore, by operating the motor M, the pulleys 47 and 48 are driven in rotation in mutually opposite directions.

Figure 11:
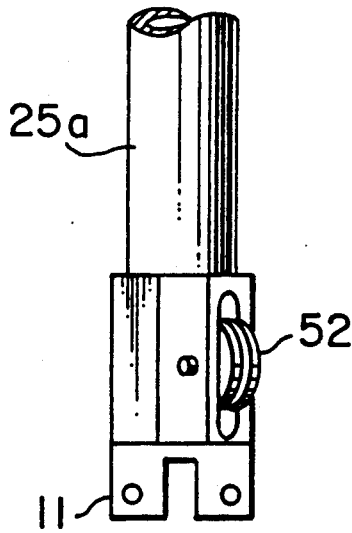
FIG. 11 is a view showing a part of the mechanism shown in FIG. 7.

As shown in FIG. 11, a pair of pulleys 52 and 53 (pulley 53 not visible in FIG. 11) are rotatably supported near the other (lower) end of the post rod 25a. The wire cables 39 have their ends fixed to the cable anchors 40 of the slide connector 26a as described hereinbefore and are passed around the pulleys 52 and 53. The cables 39 are further passed upwardly through the hollow interior of the post rod 25a and then passed around the pulleys 47 and 48. The extreme ends of the cables 39 are then fixed to the cable anchors 38. Therefore, by operating the motor M in either direction, the slide connector 26a is driven in sliding movement along the post rod 25a.

Figure 12:
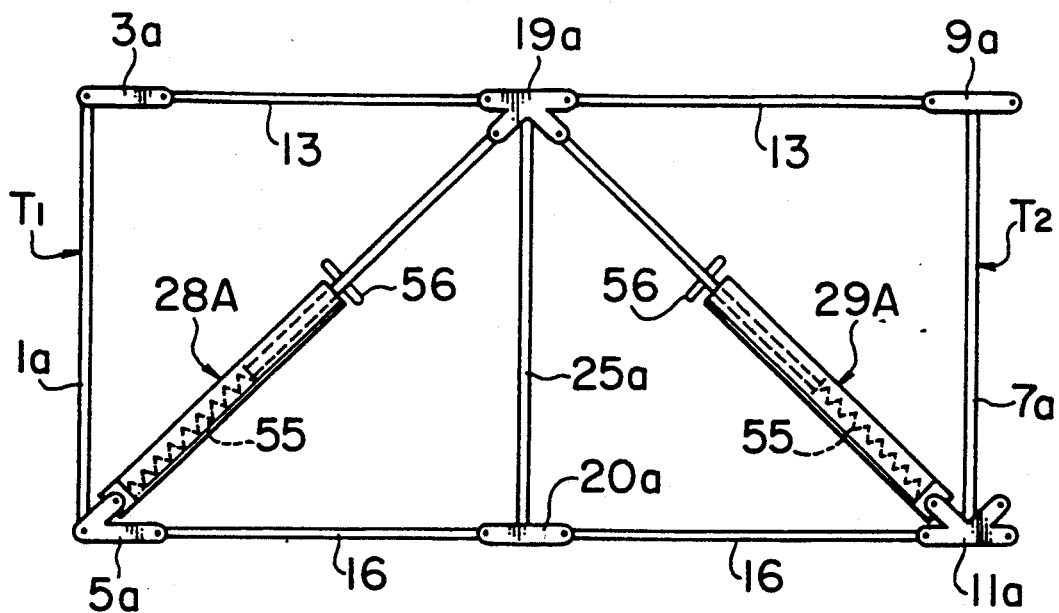
FIG. 12 is an end view similar to FIG. 4 showing a modification of the structure.
Figure 13:
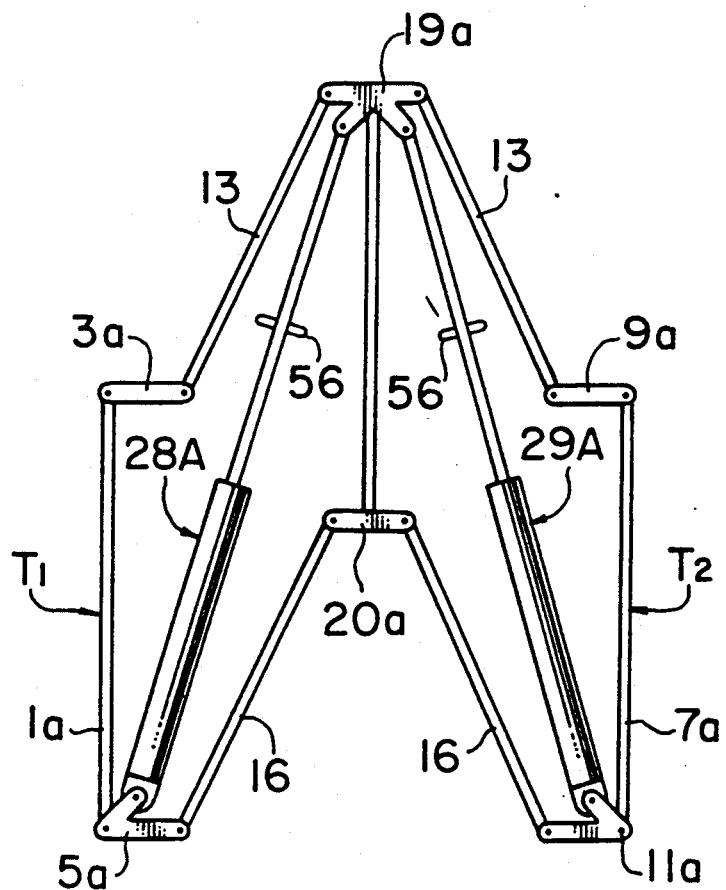
FIG. 13 is an end view showing the structure shown in FIG. 12 at the start of its folding process.

A modification of the structure of the present invention is illustrated in FIGS. 12 and 13. In this modification, the slide connectors 26 are not provided as in the embodiment shown in FIG. 4. Instead, diagonal braces 28A and 29A of extensible and contractable construction are used in place of the rigid diagonal braces 28a and 29a. The lower ends of the diagonal braces 28A and 29A are pin connected to the joint connectors 5a and 11a. The upper ends of the diagonal braces 28A and 29A are pin jointed to the intermediate joint connector 19a. The diagonal braces 28A and 29A have a telescopic construction. A spring or a rubber member 55 for imparting elongating force is installed in each piston. Stops 56 are fixed to the piston-rod parts of the diagonal braces 28A and 29 for limiting the degree of contraction thereof. The modification illustrated in FIGS. 12 and 13 is functionally equivalent to the preceding embodiment.

Figure 14:
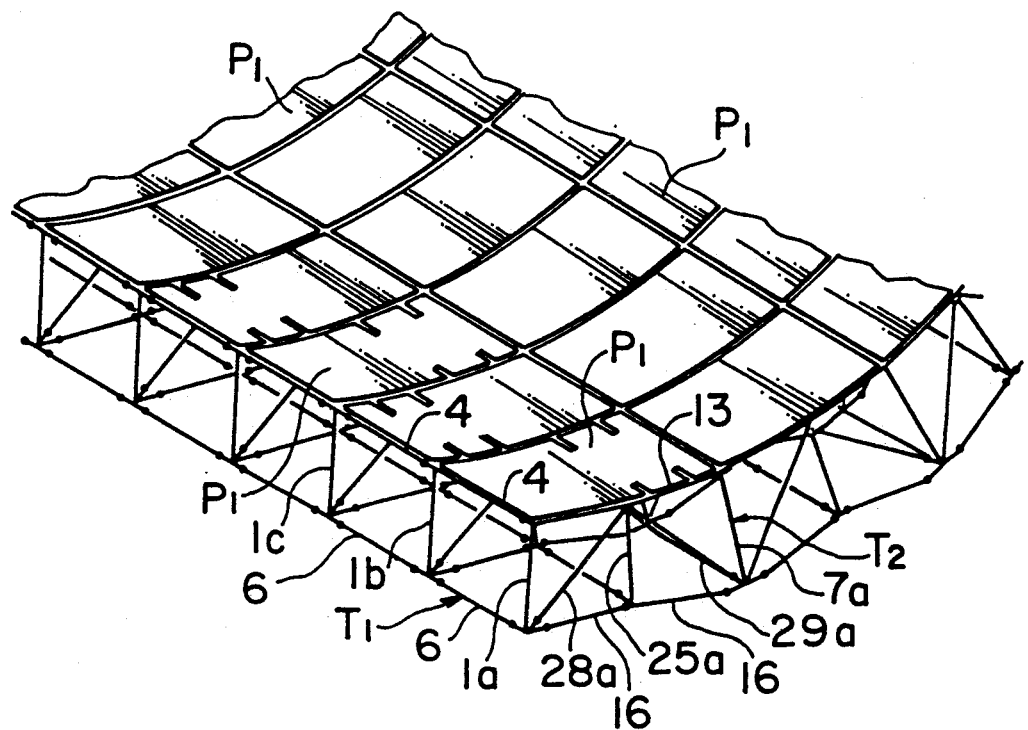
FIG. 14 is a perspective view of an embodiment of the expansible structure of the present invention provided with panels having curvature in one direction or single curvature in expanded state.
Figure 15:
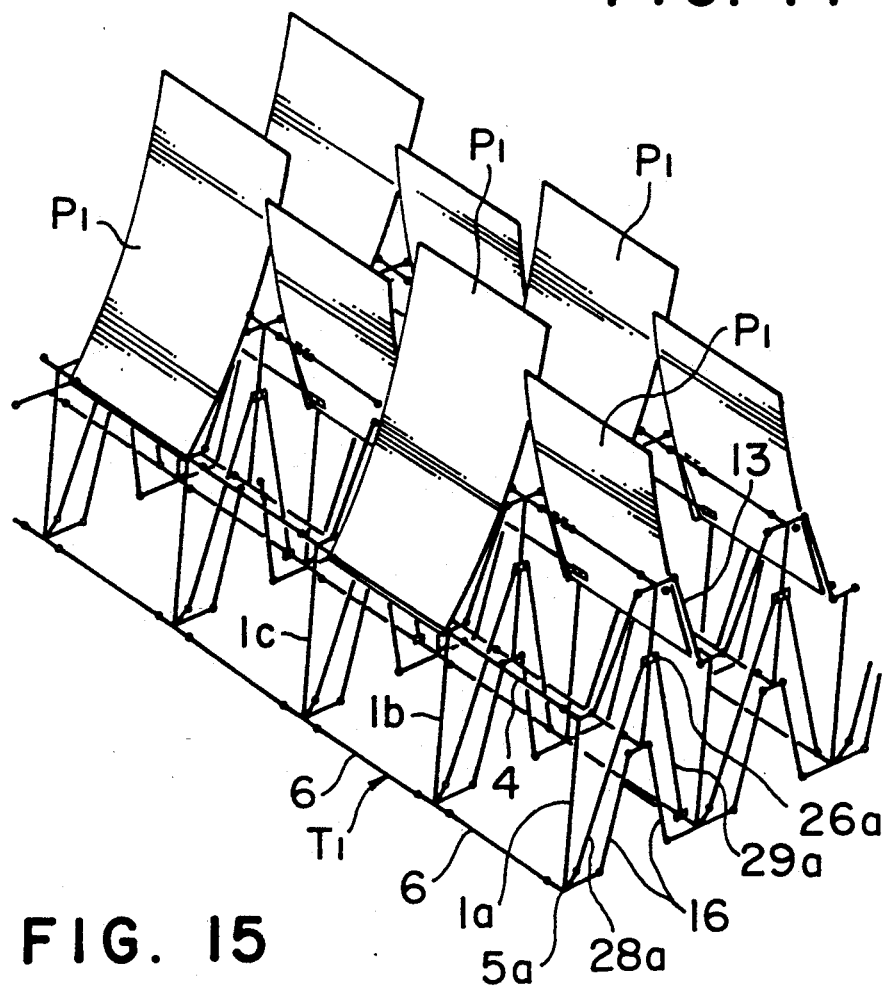
FIG. 15 is a perspective view of the same structure in a state at the start of its expanding process.
Figure 16:
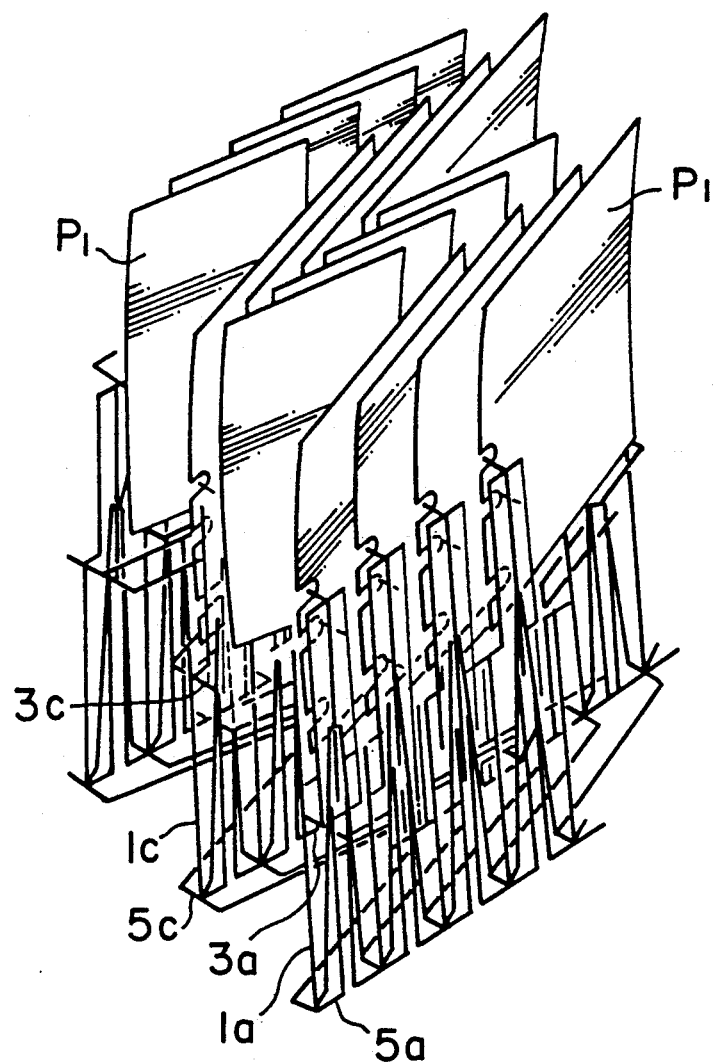
FIG. 16 is a perspective view of the same structure with panels in a state immediately prior to completion of he folding process.

In still another embodiment of the present invention as shown in FIGS. 14, 15, and 16, panels $P_1$ with single curvature, that is, curvature in a single direction, are used instead of the planar panels P of the preceding embodiments. The skeletal structure supporting the panels $P_1$ is the same as that shown in FIG. 1. However, in the case where panels $P_1$ having curvature are used, the convex surfaces of the adjacent panels $P_1$ confront each other when the structure is folded in the same manner as in the case shown in FIG. 3. Consequently, it is difficult to obtain a snugly nestled state of the panels $P_1$ having surface contact as in the case of planar panels P. Thus the compacting or folding efficiency is poor.

This problem is solved in the following manner. As seen in FIGS. 15 and 16, the panels are not mounted on every consecutive bay of the skeletal structure. Instead, the panels $P_1$ are mounted alternately on every other bay of two adjacent bays over the first and second trusses $T_1$ and $T_2$. By this arrangement, the adjacent panels $P_1$ assume a configuration wherein convex surfaces are confronted by concave surfaces. Therefore the stowing efficiency becomes good. In this embodiment, there is afforded a surface shape corresponding to a curved surface formed by a composite of a large number of panels $P_1$ when the skeletal structure is in deployed or expanded state as shown in FIG. 14.

The present invention is applicable not only to expansible structures with single-curvature panels, as described above, but also to such structures with double curvature panels as illustrated by one example shown in FIG. 17 and described hereinbelow. The structure of this example is suitable for forming parabolic surfaces which are particularly advantageous for applications to antennas and solar heat ray collectors. In FIG. 17, the three-dimensional directions are indicated by space coordinate axes X, Y, and Z.

FIG. 17(0) shows the structure in expanded state as viewed in the direction to face the panels $P_2$, that is, along the direction of the Z axis. FIGS. 17(I), 17(II), and 17(III) are views in the X-axis direction respectively of the structure in expanded state, the state at the beginning of the folding and its state of being half folded. FIGS. 17(I)', 17(II)', and 17(III)' are views in the Y-axis direction respectively of the structure in expanded state, its state at the beginning of its folding, and its half folded state. In these figures, skeletal members which can be elongated and contracted, as the diagonal braces 28A and 29A shown in FIG. 12 are designated by reference numeral 60. Skeletal members which do not elongate and contract are designated by reference numeral 61. The basic construction of the frame structure comprising these skeletal members is the same as that of the preceding embodiment except that it is in a form conforming to a curved surface constituted by a collection of double-curvature panels $P_2$.

The structure described above is folded in the sequence of (I)(I)'→(II)(II)'→(III)(III)'. Finally, it assumes the fully folded state (not shown). The action of the structure of expanding from the fully folded state is motivated by the tendency of members of the structure of elongating/contracting skeletal members to return to their original states. This expanding action does not take place in the successive sequence of fully folded state→(III)(III)'→(II)(II)'→(I)(I)'. Instead, these steps occur simultaneously. Therefore, the expansion assisting mechanisms such as the torsion springs as described before may be used also in the case of this embodiment.

In this embodiment, the panels are adapted to form a parabolic surface. The present invention is also applied to the forming of other curved surfaces such as spherical surfaces.

Thus, the present invention provides an expansible structure having a panel supporting truss construction by which folding and expanding of panels of planar surfaces and surfaces of single and double curvatures are made possible.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A collapsible unitary truss structure in the form of an open framework of a shape of a rectangular parallelpiped when expanded, comprising:

three first vertical truss members having ends disposed parallel and spaced apart in a first common plane;

six first joint connectors mounted on respective ends of said first vertical truss members;

four first horizontal truss members pivotally connected to and between adjacent pairs of said first joint connectors mounted on adjacent ends of respective first vertical truss members;

three second vertical truss members having ends disposed parallel and spaced apart in a second common plane which is parallel to said first common plane;

six second joint connectors mounted on respective ends of said second vertical truss members;

four second horizontal truss members pivotally connected to and between adjacent pairs of said second joint connectors mounted on adjacent ends of respective second vertical members;

three post rods having ends disposed parallel and spaced apart in a third common plane which is parallel to said first and second common planes, each of said three post rods being disposed midway between opposed first and second vertical truss members;

six intermediate joint connectors mounted on respective ends of said post rods, each of said six intermediate joint connectors being disposed on a line connecting opposed first and second joint connectors;

four horizontal connective members pivotally connected to and between adjacent pairs of said intermediate joint connectors mounted on adjacent ends of respective post rods; and twelve horizontal coupling members each of which is pivotally connected to and between one of said intermediate joint connectors and one of said first and second joint connectors opposed to said one of said intermediate joint connectors;

said six intermediate joint connectors being such as to allow each pair of said horizontal coupling members to make a rotational displacement within planes containing opposing vertical truss members;

said first and second vertical truss members forming first and second trusses which are foldable in the same direction in the form of two dihedral V-shapes as viewed in the direction of the vertical truss members with the middle vertical truss members of said first vertical truss members and of said second vertical truss members, respectively, constituting the intersection lines of the two dihedral V-shapes.

2. The collapsible unitary truss structure according to claim 1, further comprising:

elastic means provided for elastically urging said horizontal truss members so as to take positions lying in said first and second common planes.

3. The collapsible unitary truss structure according to claim 2, wherein said elastic means are torsion springs provided at respective first and second joint connectors.

4. A collapsible unitary truss structure in the form of an open framework of a shape of a rectangular parallelpiped when expanded, comprising:

three first vertical truss members having ends disposed parallel and spaced apart in a first common plane;

six first joint connectors mounted on respective ends of said first vertical truss members;

four first horizontal truss members pivotally connected to and between adjacent pairs of said first joint connectors mounted on adjacent ends of respective first vertical truss members;

three second vertical truss members having ends disposed parallel and spaced apart in a second common plane which is parallel to said first common plane;

six second joint connectors mounted on respective ends of said second vertical truss members;

four second horizontal truss members pivotally connected to and between adjacent pairs of said second joint connectors mounted on adjacent ends of respective second vertical members;

three post rods having ends disposed parallel and spaced apart in a third common plane which is parallel to said first and second common planes, each of said three post rods being disposed midway between opposed first and second vertical truss members;

six intermediate joint connectors mounted on respective ends of said post rods, each of said six intermediate joint connectors being disposed on a line connecting opposed first and second joint connectors;

four horizontal connective members pivotally connected to and between adjacent pairs of said intermediate joint connectors mounted on adjacent ends of respective post rods;

twelve horizontal coupling members each of which is pivotally connected to and between one of said intermediate joint connectors and one of said first and second joint connectors opposed to said one of said intermediate joint connectors;

said six intermediate joint connectors being such as to allow each pair of said horizontal coupling members to make a rotational displacement within planes containing opposing vertical truss members;

said first and second vertical truss members forming first and second trusses which are foldable in the same direction in the form of two dihedral V-shapes as viewed in the direction of the vertical truss members with the middle vertical truss members of said first vertical truss members and of said second vertical truss members, respectively, constituting the intersection lines of the two dihedral V-shapes; and elastic means provided for elastically urging said horizontal truss members so as to take positions lying in said first and second common planes, wherein said elastic means are flexible rods provided between adjacent joint connectors connected by said horizontal truss members, said flexible rod having a characteristic of tending to straighten.

5. The collapsible unitary truss structure according to claim 1, wherein respective rectangular bays are defined by one of said horizontal truss members, one of said horizontal connective members, and two adjacent horizontal coupling members, and each of the bays has a flat panel secured therein.

6. A collapsible unitary truss structure in the form of an open framework of a shape of a rectangular parallelpiped when expanded, comprising:

three first vertical truss members having ends disposed parallel and spaced apart in a first common plane;

six first joint connectors mounted on respective ends of said first vertical truss members;

four first horizontal truss members pivotally connected to and between adjacent pairs of said first joint connectors mounted on adjacent ends of respective first vertical truss members;

three second vertical truss members having ends disposed parallel and spaced apart in a second common plane which is parallel to said first common plane;

six second joint connectors mounted on respective ends of said second vertical truss members;

four second horizontal truss members pivotally connected to and between adjacent pairs of said second joint connectors mounted on adjacent ends of respective second vertical members;

three post rods having ends disposed parallel and spaced apart in a third common plane which is parallel to said first and second common planes, each of said three post rods being disposed at the middle between opposed first and second vertical truss members;

six intermediate joint connectors mounted on respective ends of said post rods, each of said six intermediate joint connectors being disposed on a line connecting opposed first and second joint connectors;

four horizontal connective members pivotally connected to and between adjacent pairs of said intermediate joint connectors mounted on adjacent ends of respective post rods; and twelve horizontal coupling members each of which is pivotally connected to and between one of said intermediate joint connectors and one of said first and second joint connectors opposed to said one of said intermediate joint connectors;

said six intermediate joint connectors being such as to allow each pair of said horizontal coupling members to make a rotational displacement within planes containing opposing vertical truss members;

said first and second vertical truss members forming first and second trusses which are foldable in the same direction in the form of two dihedral V-shapes as viewed in the direction of the vertical truss members with the middle vertical truss members of said first vertical truss members and of said second vertical truss members, respectively, constituting the intersection lines of the two dihedral V-shapes;

wherein rectangular bays are defined by one of said horizontal truss members, one of the said horizontal connective members, and curved panels are respectively mounted over two adjacent bays along said coupling members and secured alternately to one and the other of two adjacent bays.

7. The collapsible unitary truss structure according to claim 6, wherein
said curved panels are panels having single curvature.

8. The collapsible unitary truss structure according to claim 6, wherein
said curved panels are panels having double curvature.

9. The collapsible unitary truss structure according to claim 1, further comprising:

slide connectors fitted around respective post rods to be slidable therealong;

diagonal braces coupling each of said slide connectors and corresponding joint connectors at one of said ends of the first and second vertical truss members.

10. The collapsible unitary truss structure according to claim 1, further comprising:

extensible diagonal braces coupling the first and second joint connectors at one of said ends of the first and second vertical truss members and the intermediate joint connectors joined to said horizontal coupling members connected to the other of said ends one of the first and second vertical truss members.

11. A collapsible unitary truss structure in the form of an open framework of a shape of a rectangular parallelpiped when expanded, comprising:

three first vertical truss members having ends disposed parallel and spaced apart in a first common plane;

six first joint connectors mounted on respective ends of said first vertical truss members;

four first horizontal truss members pivotally connected to and between adjacent pairs of said first joint connectors mounted on adjacent ends of respective first vertical truss members such that said first horizontal truss members are only pivotable in a first pivoting plane perpendicular to said first common plane;

three second vertical truss members having ends disposed parallel and spaced apart in a second common plane which is parallel to said first common plane;

six second joint connectors mounted on respective ends of said second vertical truss members;

four second horizontal truss members pivotally connected to and between adjacent pairs of said second joint connectors mounted on adjacent ends of respective second vertical members such that said second horizontal truss members are only pivotable in a second pivoting plane perpendicular to said second common plane;

three post rods having ends disposed parallel and spaced apart in a third common plane which is parallel to said first and second common planes, each of said three post rods being disposed midway between opposed first and second vertical truss members;

six intermediate joint connectors mounted on respective ends of said post rods, each of said six intermediate joint connectors being disposed on a line connecting opposed first and second joint connectors;

four horizontal connective members pivotally connected to and between adjacent pairs of said intermediate joint connectors mounted on adjacent ends of respective post rods such that said horizontal connective members are only pivotable in a third pivoting plane perpendicular to said third common plane;

twelve horizontal coupling members each of which is pivotally connected to and between one of said intermediate joint connectors and one of said first and second joint connectors opposed to said one of said intermediate joint connectors;

said six intermediate joint connectors being such as to allow each pair of said horizontal coupling members to make a rotational displacement within planes containing opposing vertical truss members;

said first and second vertical truss members forming first and second trusses which are foldable in the same direction in the form of two dihedral V-shapes as viewed in the direction of the vertical truss members with the middle vertical truss members of said first vertical truss members and of said second vertical truss members, respectively, constituting the intersection lines of the two dihedral V-shapes.

12. A collapsible unitary truss structure in the form of an open framework of a shape of a rectangular parallelpiped when expanded, consisting essentially of:

three first vertical truss members having ends disposed parallel and spaced apart in a first common plane;

six first joint connectors mounted on respective ends of said first vertical truss members;

four first horizontal truss members pivotally connected to and between adjacent pairs of said first joint connectors mounted on adjacent ends of respective first vertical truss members;

three second vertical truss members having ends disposed parallel and spaced apart in a second common plane which is parallel to said first common plane;

six second joint connectors mounted on respective ends of said second vertical truss members;

four second horizontal truss members pivotally connected to and between adjacent pairs of said second joint connectors mounted on adjacent ends of respective second vertical members;

three post rods having ends disposed parallel and spaced apart in a third common plane which is parallel to said first and second common planes, each of said three post rods being disposed midway between opposed first and second vertical truss members;

six intermediate joint connectors mounted on respective ends of said post rods, each of said six intermediate joint connectors being disposed on a line connecting opposed first and second joint connectors;

four horizontal connective members pivotally connected to and between adjacent pairs of said intermediate joint connectors mounted on adjacent ends of respective post rods;

twelve horizontal coupling members each of which is pivotally connected to and between one of said intermediate joint connectors and one of said first and second joint connectors opposed to said one of said intermediate joint connectors;

said six intermediate joint connectors being such as to allow each pair of said horizontal coupling members to make a rotational displacement within planes containing opposing vertical truss members;

said first and second vertical truss members forming first and second trusses which are foldable in the same direction in the form of two dihedral V-shapes as viewed in the direction of the vertical truss members with the middle vertical truss members of said first vertical truss members and of said second vertical truss members, respectively, constituting the intersection lines of the two dihedral V-shapes.

* * * * *